Aug. 15, 1939.  C. H. TAYLOR  2,169,437
PLUGGING OF WALLS OR THE LIKE
Filed Jan. 18, 1938
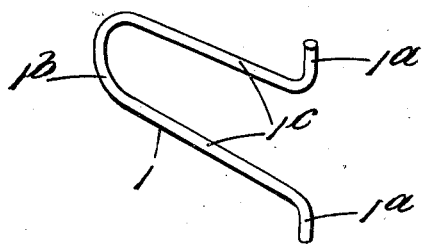
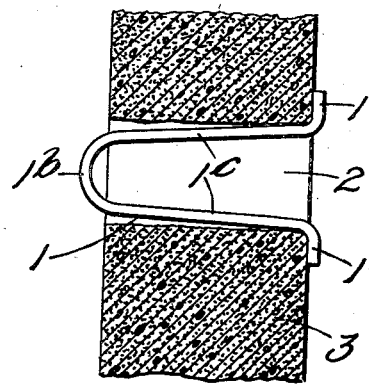
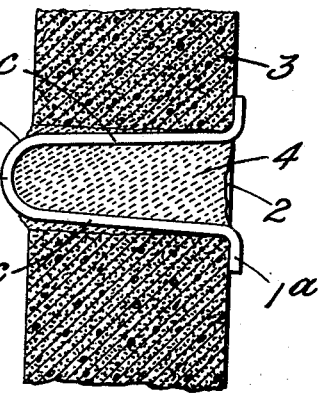
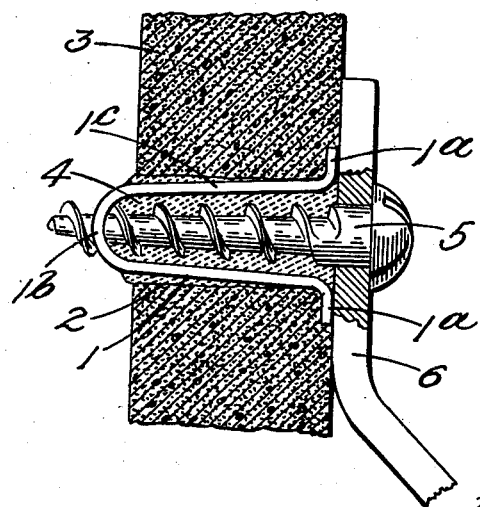
Inventor
Charles Harold Taylor
By Peck & Peck
Attys Patented Aug. 15, 1939

2,169,437

UNITED STATES PATENT OFFICE

2,169,437
PLUGGING OF WALLS OR THE LIKE

Charles Harold Taylor, Perivale, Greenford, England

Application January 18, 1938, Serial No. 185,583
In Great Britain January 23, 1937

2 Claims. (Cl. 72—105)

This invention relates to the plugging of walls, ceilings, floors or the like, hereinafter exemplified as "walls", to provide a hold for screws, nails or other securing means, hereinafter referred to as "screws".

Various methods of plugging walls to provide a hold for screws have already been proposed in which a hole is drilled in the wall and a plug of fibre, wood, lead or other material is inserted into the hole to be expanded therein by the screw as this is driven into the plug. It has recently been proposed also to utilise a plastic plug composed, for example, of a moistened mixture of asbestos fibres, cement, flour and a filling material such as brickdust, the plug hardening subsequent to its insertion into the hole and before or after the screw has been driven home.

The satisfactory employment of these methods and plugs is, however, difficult when the wall is built of hollow bricks, tiles or other elements, since the hole drilled in the wall usually extends completely through the thickness of the face of the brick or the like to open into the cavity within the latter. As a consequence the plug, whether rigid or plastic, cannot be correctly located in the hole and tends to become displaced inwardly thereof during the driving home of the screw while it is usually difficult to plug the hole satisfactorily with a plastic mass which must be rammed home since the mass tends to pass completely through the hole.

It is the object of the present invention to provide means the use of which shall enable all the difficulties referred to above to be overcome.

According to the invention a member for temporarily retaining a plug or plugging mass in a hole in a wall comprises a portion adapted to extend transversely of the hole, one or more portions adapted to extend laterally from the mouth of the hole and to bear on the exposed surface of the wall and one or more connecting portions adapted to extend in the direction of the length of the hole from the transverse portion to the laterally extending portion or portions.

One construction of a retaining member according to the invention is illustrated, by way of example, in the accompanying drawing, wherein—

Fig. 1 is a perspective view of the member,

Fig. 2 is a vertical section showing the member in position in a hole formed in a hollow brick, Fig. 3 is a similar view showing a plastic plug engaged in the hole, and Fig. 4 illustrates a screw driven home into the plug of Fig. 3.

The retaining member 1 is preferably formed in one piece, for example (as shown) from a length of wire or strip metal bent to substantially U-shape with the free ends 1a each turned outwardly through about 90° in the plane of the U.

In use (see Figs. 2 to 4) the retaining member 1 is inserted into the hole 2 in the wall 3, preferably was a fairly tight fit at least near the mouth of the hole, until the laterally or outwardly extending portions 1a come to bear on the exposed wall-surface. The plug to be employed, illustrated as a plastic plug 4, is then inserted and driven or rammed in until it bears by its inner end on the transversely extending portion 1b of the retaining member 1, i. e. the bend of the U-shaped one-piece member. A screw 5 may then be driven home into the plug 4 in a very satisfactory manner, the point of the screw displacing the inner end 1b of the retaining member slightly to one side if the screw should be longer than the connecting portions 1c of the member. It is preferred to employ round-section wire (as illustrated) for the retaining member in order that this effect may be produced more surely. 6 in Fig. 4 indicates a fitting being secured by the screw 5 and, as can be seen, the tightening of the screw has caused the fitting to force the laterally extending portions 1a of the retaining member into the surface of the wall 3.

When the screw 5 is driven home, the plug 4, as will be appreciated, is securely retained in place owing to its own properties and no reliance is placed on the retaining member 1 for supporting the load on the screw. The retaining member may be of comparatively small cross-section since it only has to serve for temporarily retaining the plug or plugging mass in place and the major stresses developed in the member are tensions in the connecting portions 1c thereof.

What I claim is:

1. The combination with a wall plug or plugging mass adapted to provide an anchor for a screw or the like applied to the plug from the outer side of the wall, of a member for temporarily retaining the plug or plugging mass in a hole extending inwardly through a wall portion, said member comprising a part adapted to extend transversely of the hole and the plug therein to support the plug against inward longitudinal movement, at least one portion formed to engage the wall at or near the mouth of the hole to support the member and plug against inward movement in the hole, and at least one longitudinal portion joining said transverse and wall engaging portions.

2. The combination according to claim 1 wherein the retaining member is formed of a wire like length bent to substantially U-shape with the free ends of the U legs turned outwardly substantially in the plane of the U.

CHARLES HAROLD TAYLOR.